United States Patent
Matsunaga et al.

(10) Patent No.: US 6,690,560 B2
(45) Date of Patent: Feb. 10, 2004

(54) ELECTRICAL LOAD CONTROLLER AND VEHICLE AIR CONDITIONER USING THE SAME

(75) Inventors: Ken Matsunaga, Kariya (JP); Yuji Takeo, Toyoake (JP); Kyohsuke Hattori, Osaka (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/128,191

(22) Filed: Apr. 24, 2002

(65) Prior Publication Data

US 2002/0167227 A1 Nov. 14, 2002

(30) Foreign Application Priority Data

Apr. 24, 2001 (JP) ........................ 2001-126516
Apr. 26, 2001 (JP) ........................ 2001-130126

(51) Int. Cl.$^7$ ................................ H02H 5/04
(52) U.S. Cl. ........................ 361/104; 236/38
(58) Field of Search ................ 361/104, 103, 361/105, 106; 236/38; 219/61.7, 86.31

(56) References Cited

U.S. PATENT DOCUMENTS

| | | | | |
|---|---|---|---|---|
| 4,198,617 A | * | 4/1980 | Hara | 337/403 |
| 4,285,391 A | * | 8/1981 | Bourner | 165/30 |
| 4,512,324 A | * | 4/1985 | Neary | 123/557 |
| 5,000,662 A | * | 3/1991 | Yamamoto et al. | 417/32 |
| 5,329,804 A | * | 7/1994 | Germany et al. | 73/1 G |
| 5,408,575 A | * | 4/1995 | Morris | 388/830 |
| 5,985,651 A | * | 11/1999 | Hunicke-Smith | 435/285.1 |
| 6,285,828 B1 | * | 9/2001 | Cafaro | 392/385 |
| 6,491,110 B2 | * | 12/2002 | Gil | 169/43 |

FOREIGN PATENT DOCUMENTS

| | | |
|---|---|---|
| JP | A8-30336 | 2/1996 |
| JP | A9-69392 | 3/1997 |
| JP | A10-157446 | 6/1998 |

* cited by examiner

Primary Examiner—Gergory J. Toatley, Jr.
Assistant Examiner—L Ritz
(74) Attorney, Agent, or Firm—Harness, Dickey & Pierce, PLC

(57) ABSTRACT

In an electrical load controller, a thermal fuse is blown at an abnormal heating of an electrical load, so that an electrical circuit of the electrical load is disconnected. The controller controls a work amount of the electrical load by intermittently controlling electrical power to be supplied thereto. The power supply to the electrical load is intermittently stopped even when the work amount of the electrical load is controlled at a maximum amount. Therefore, an arc, generated when the thermal fuse is blown, disappears while the power supply is stopped, so that the thermal fuse can be accurately operated.

23 Claims, 6 Drawing Sheets

ELECTRICAL LOAD CONTROLLER AND VEHICLE AIR CONDITIONER USING THE SAME

CROSS-REFERENCE TO RELATED APPLICATION

This application is related to and claims priority from Japanese Patent Applications No. 2001-126516 filed on Apr. 24, 2001 and No. 2001-130126 filed on Apr. 26, 2001, the contents of which are hereby incorporated by reference.

BACKGROUND OF THE INVENTION

1. Field of the Invention

The present invention relates to a controller of an electrical load such as an electrical heater driven by direct-current electrical power. The controller is suitably used for a vehicle air conditioner.

2. Description of Related Art

In a vehicle, having an electrical drive motor for a vehicle running, such as a hybrid vehicle and a fuel-cell electrical vehicle, electrical power is supplied to the electrical drive motor from a direct-current (DC) power source having a supply voltage of approximately 300 volts (V). For example, in an air conditioner for this vehicle described in JP-A-10-157446, an electrical heater (electrical load) is used for heating air to be blown into a passenger compartment, and a high voltage of approximately 300V is applied to the electrical heater from the DC power source. Here, a thermal fuse can be used in order to protect the electrical heater by disconnecting a current-carrying circuit at an abnormal heating of the electrical heater. Although reliability of the thermal fuse is high in an alternating current (AC), reliability thereof is known to be low in a DC, especially in a high-voltage DC. Therefore, it is difficult to use the thermal fuse, for protecting the electrical load driven in the high-voltage DC.

On the other hand, in a lamp regulator described in JP-A-9-69392, DC output is converted to rectangular-wave AC output as shown in FIG. 10, and the rectangular-wave AC output is supplied to a lamp (electrical load), thereby improving the reliability of the thermal fuse. However, since only a polarity is inverted in the rectangular-wave AC output shown in FIG. 10, a voltage is always applied to the thermal fuse while the AC output is applied to the lamp. Accordingly, an arc, generated when the thermal fuse is blown, does not readily disappear, and the thermal fuse may be welded again after being arced.

SUMMARY OF THE INVENTION

In view of the foregoing problem, it is an object of the present invention to provide an electrical load controller which can accurately control an operation of a thermal fuse for an electrical load driven by DC power.

In is an another object of the present invention to provide a vehicle air conditioner using the electrical load controller.

According to the present invention, in an electrical load controller, electrical power is supplied to the electrical load from a direct-current (DC) power source through an electrical circuit, and a thermal fuse is blown at an abnormal heating of the electrical load so that the electrical circuit is disconnected at the abnormal heating. A controller controls a work amount of the electrical load by intermittently controlling electrical power to be supplied to the electrical load. In the electrical load controller, the controller intermittently stops the power supply to the electrical load even in a maximum work area where the controller controls the work amount of the electrical load at a maximum work amount. Since the power supply to the electrical load is intermittently stopped even when the electrical load is operated by the maximum work amount, an arc, generated when the thermal fuse is blown, disappears while the power supply is stopped. Therefore, it can prevent the thermal fuse from being again welded after being blown. Thus, the thermal fuse can be accurately operated while protecting the electrical load driven by DC power.

When the controller duty-controls the operation of the electrical load by the maximum work amount, the duty ratio is set lower than 100%.

Preferably, the electrical load has a plurality of electrical load parts connected in parallel with respect to the DC power source, each of the electrical load parts is energized by the DC power source through each circuit part of the electrical circuit, the thermal fuse has a plurality fuse parts each of which is connected to each of the electrical loads in series, and each fuse part is blown at abnormal heating of each electrical load part to disconnect each circuit part. Therefore, each fuse part of the thermal fuses can be used in a condition where high reliability can be obtained, and the fuse parts can be actually operated while effectively protecting the load parts driven with DC power having a high voltage and a high current. Furthermore, each load part of the electrical load can be effectively protected using the fuse parts, without using an additional relay, an additional temperature sensor and the like, thereby reducing production cost.

Accordingly, when the electrical load controller is used for a vehicle air conditioner so that the electrical load is used as an electrical heater for heating air blown into a passenger compartment, heating operation in the vehicle air conditioner can be accurately controlled.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to FIGS. 1–9. In this embodiment, the present invention is typically applied to an air conditioner for a vehicle including an electrical drive motor (not shown) for a vehicle running.

Figure 1:
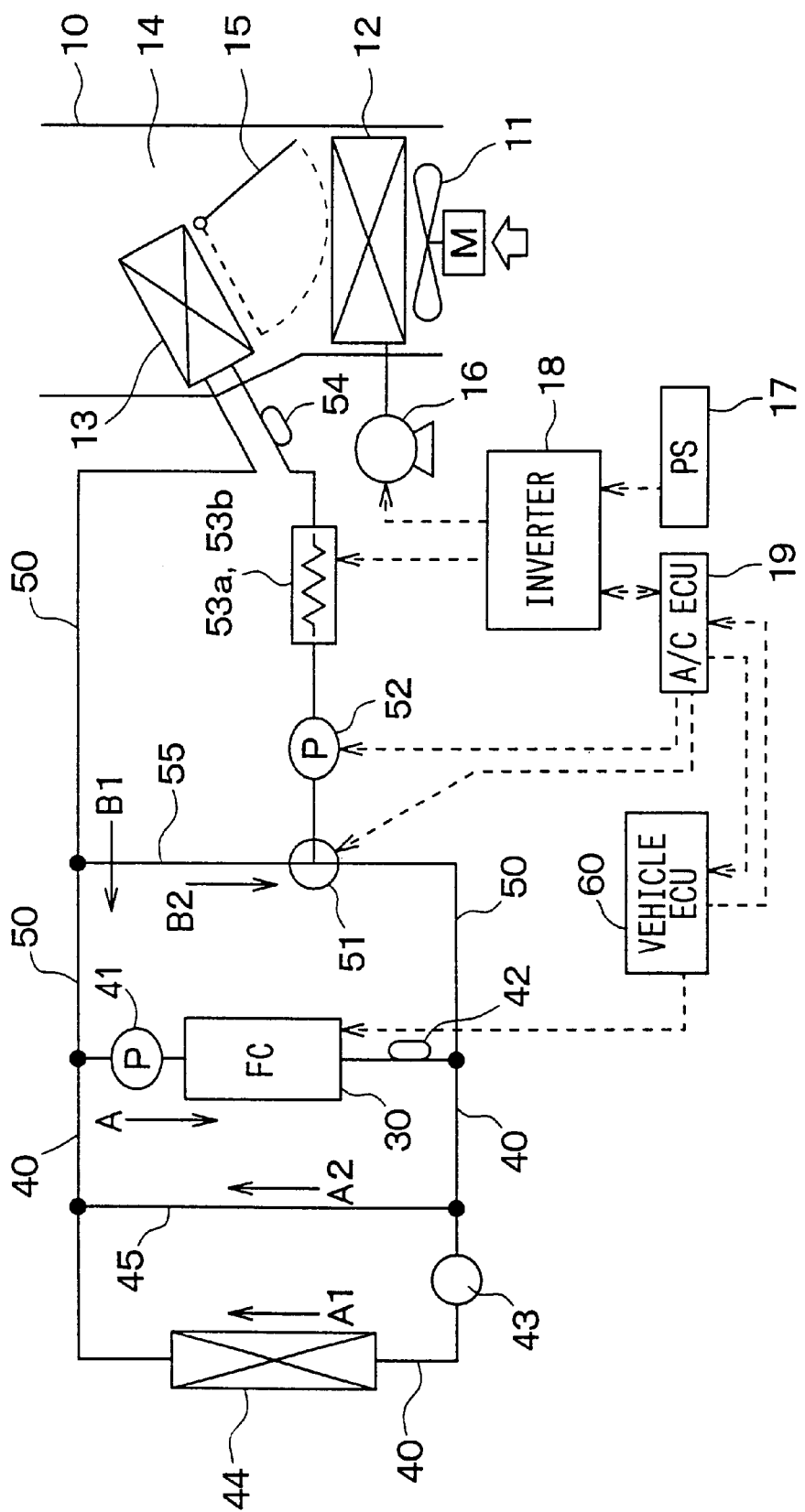
FIG. 1 is a schematic diagram showing a vehicle air conditioner according to a preferred embodiment of the present invention.

As shown in FIG. 1, a blower 11 is disposed in an air passage duct 10, and an evaporator 12 is disposed in the air passage duct 10 at a downstream air side of the blower 11. The blower 11 is disposed to blow inside air (i.e., air inside a passenger compartment) introduced from an inside air introduction port (not shown), and to blow outside air (i.e., air outside the passenger compartment) introduced from an outside air introduction port (not shown). The evaporator 12 cools the blown air by performing heat-exchange between the air and refrigerant flowing therein.

A heater core 13 is disposed in the air passage duct 10 at a downstream air side of the evaporator 12. The heater core 13 heats air flowing from the evaporator 12, by performing heat-exchange between the air and hot water flowing therein. The heater core 13 is disposed to close an about half of the air passage in the air passage duct 10, so that a bypass passage 14 through which air bypasses the heater core 13 is provided in the air passage duct 10 at a side of the heater core 13. An air mixing damper 15 is rotatably disposed in the air passage duct 10 at an upstream air side of the heater core 13. The air mixing damper 15 adjusts the temperature of air to be blown into the passenger compartment by adjusting a flow ratio between air passing through the heater core 13 and air passing through the bypass passage 14. In addition, by controlling a flow amount or a temperature of hot water (cooling water) flowing into the heater core 13, the temperature of air blown into the passenger compartment can be adjusted. In this embodiment, air from the heater core 13 and air from the bypass passage 14 are mixed, so that conditioned air having a predetermined temperature can be obtained.

Further, a defroster air outlet, a face air outlet and a foot air outlet are provided in the air passage duct 10 at the most downstream air side. The defroster air outlet is provided so that conditioned air having a predetermined temperature is blown toward an inner surface of a windshield from the defroster air outlet. The face air outlet is provided so that conditioned air is blown toward an upper side of a passenger from the face air outlet, and the foot air outlet is provided so that conditioned air is blown toward a lower side of the passenger from the foot air outlet.

A refrigerant cycle system of the vehicle air conditioner is constructed by an electrical compressor 16 for compressing and discharging refrigerant, the evaporator 12, a condenser (not shown) for condensing refrigerant, an expansion valve (not shown) for decompressing refrigerant, and the like. The electrical compressor 16 includes a compression mechanism for compressing and discharging refrigerant, and an alternating-current (AC) motor for driving the compression mechanism. Direct-current (DC) power, outputted from a DC power source (PS) 17 mounted in the vehicle, is converted to AC power by an inverter 18, and the converted AC power is supplied to the AC motor of the electrical compressor 16. In this embodiment, the DC power source has a rated voltage of 288V. The DC power source 17 is charged by a fuel cell (FC) 30 which generates electrical power using an electrochemical reaction between hydrogen and oxygen.

A first cooling-water circuit 40 is provided to adjust the temperature of the fuel cell 30 within a predetermined temperature range. A first water pump 41, the fuel cell 30, a first water temperature sensor 42, a thermostat 43 and a radiator 44 are disposed in the first cooling-water circuit 40. The first water pump 41 is disposed to circulate cooling water in the first cooling-water circuit 40 (fuel cell 30) in a direction indicated by arrow A, and the first water temperature sensor 42 is disposed to detect the temperature of cooling water passing through the fuel cell 30. The thermostat 43 opens and closes the first cooling-water circuit 40 in accordance with the detected temperature of cooling water, and the radiator 44 performs heat-exchange between cooling water and outside air. An upstream water side of the first water pump 41 in first cooling-water circuit 40 is connected to a downstream water side of the fuel cell 30 in the first cooling-water circuit 40 by a first bypass cooling-water circuit 45.

When the cooling water temperature detected by the first water temperature sensor 42 is equal to or higher than a high set temperature, the thermostat 43 is opened so that cooling water flows into the radiator 44 in a direction indicated by arrow A1. Therefore, the cooling water is cooled by the radiator 44, and the cooled water returns to the fuel cell 30. When the temperature of cooling water is equal to or lower than a low set temperature, the thermostat 43 is closed so that cooling water flows into the first bypass cooling-water circuit 45 in a direction indicated by arrow A2 while bypassing the radiator 44. Thereafter, the cooling water is returned to a side of the first water pump 41. Using the operation of the thermostat 43, the temperature of the fuel cell 30 is adjusted within a suitable temperature range in which high power-generation efficiency can be obtained.

Cooling water, heated by the fuel cell 30, flows into the heater core 13 through a second cooling-water circuit 50, so that heat from the fuel cell 30 is used for performing air-conditioning operation through the cooling water. One end of the second cooling-water circuit 50 is connected to the first cooling-water circuit 40 at a downstream water side of the fuel cell 30, and the other end thereof is connected to the first cooling-water circuit 40 at an upstream water side of the first water pump 41.

An electrical three-way valve (three-way valve) 51, a second electrical water pump (second water pump) 52, first and second electrical heaters (i.e., electrical loads) 53a, 53b, a second water temperature sensor 54 and the heater core 13 are disposed in the second cooling-water circuit 50. The three-way valve 51 is disposed to switch one of flows in the second cooling-water circuit 50, and the second water pump 52 circulates cooling water in the second cooling-water circuit 50 in a direction indicated by arrow B1. The electrical heaters 53a, 53b are disposed to heat cooling water to be supplied into the heater core 13, and the second water temperature sensor 54 is disposed to detect the temperature of cooling water having passed through the electrical heaters 53a, 53b. That is, the second water temperature sensor 54 is disposed to detect the temperature of cooling water flowing into the heater core 13. A second bypass cooling-water circuit 55 is branched from the second cooling-water circuit 50 at a downstream water side of the heater core 13. The second bypass cooling-water circuit 55 is connected to the three-way valve 51, as shown in FIG. 1.

An air-conditioning electronic control unit (air-conditioning ECU) 19 includes a microcomputer (not shown) constructed by a central processing unit (CPU), a read only memory (ROM), a random access memory (RAM), and the like. The air-conditioning ECU 19 performs operational process based on input signals in accordance with programs and maps stored in the microcomputer. The air-conditioning ECU 19 controls the air mixing damper 15, the inverter 18, the three-way valve 51, the second water pump 52, the electrical heaters 53a, 53b and the like, based on input signals in accordance with programs and maps stored in the microcomputer. A vehicle control unit (vehicle ECU) 60 includes a microcomputer (not shown) constructed by a CPU, a ROM, a RAM and the like. The vehicle ECU 60 performs operational process based on input signals in accordance with programs and maps stored in the microcomputer. The vehicle ECU 60 controls a power generation amount of the fuel cell 30 based on a charged amount of the DC power source 17 while controlling the electrical drive motor based on a pedaled amount of an accelerator pedal (not shown) and the like. The information signals communicate with each other between the vehicle ECU 60 and the air-conditioning ECU 19.

Figure 2:
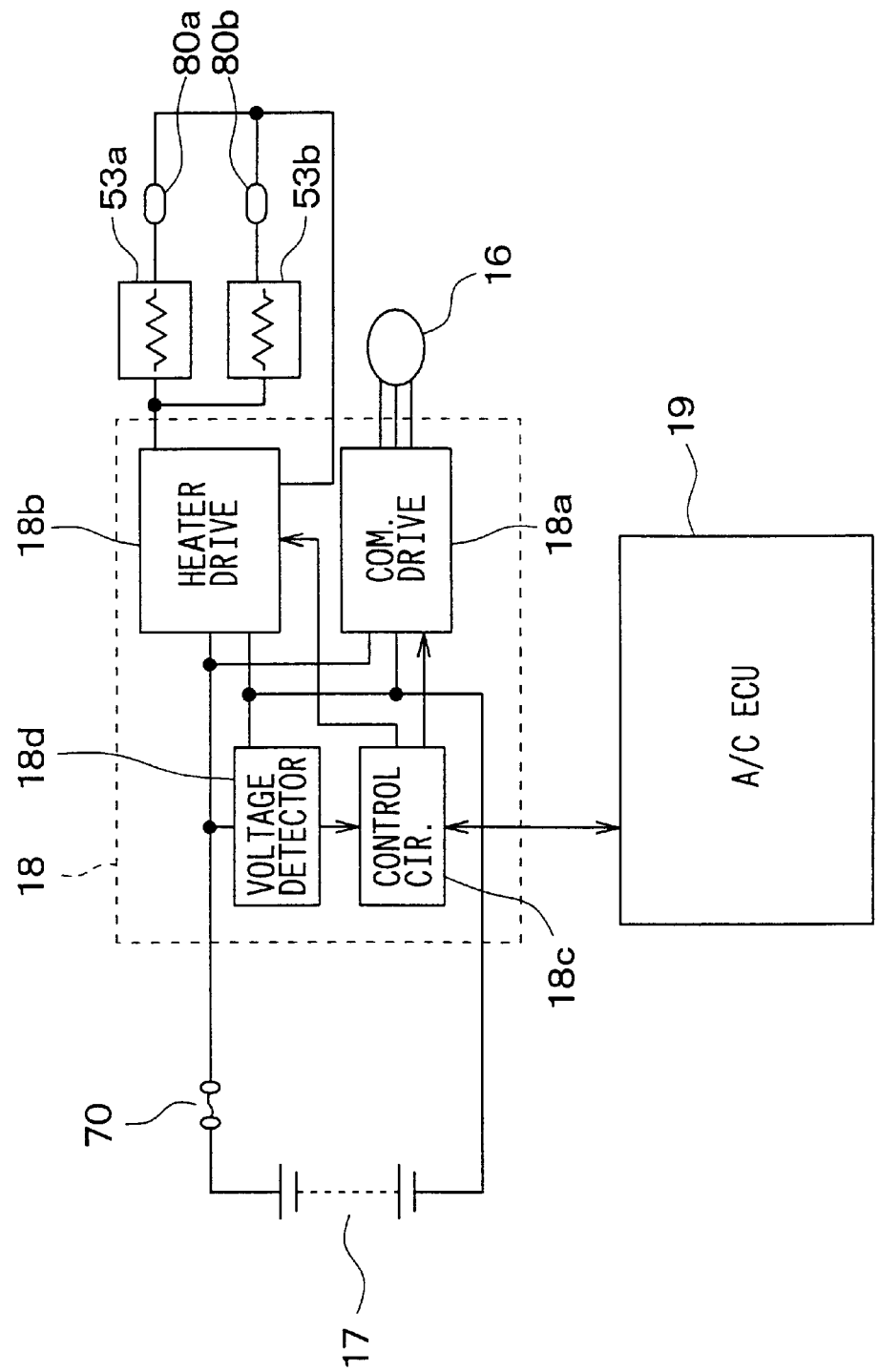
FIG. 2 is a block diagram showing an electrical circuit portion shown in FIG. 1.

Each of the electrical heaters 53a, 53b is a sheath heater including therein a nichrome wire. DC power from the DC power source 17 is duty-controlled by the inverter 18, and is supplied to the electrical heaters 53a, 53b. As shown in FIG. 2, the electrical heaters 53a, 53b are connected in parallel with respect to the DC power source 17. In this embodiment, each of the heaters 53a, 53b has a resistance value of 60 ohms ($\Omega$), and a rated voltage of the DC power source 17 is 300V. Therefore, rated electrical power used by each of the electrical heaters 53a, 53b is 1.5 kilowatts (kW). In this case, when an actual maximum voltage of the DC power source 17 is equal to or lower than 350V, actual maximum power actually used for each of the electrical heaters 53a, 53b can be restricted equal to or lower than 2 kW.

A first thermal fuse 80a is connected to the first electrical heater 53a in series, and is closely attached to the first electrical heater 53a for detecting the temperature of the first electrical heater 53a. A second thermal fuse 80b is connected to the second electrical heater 53b in series, and is closely attached to the second electrical heater 53b for detecting the temperature of the second electrical heater 53b. The thermal fuses 80a, 80b disconnect current-carrying circuits for the electrical heaters 53a, 53b when the electrical heaters 53a, 53b are abnormally heated, respectively.

Figure 3:
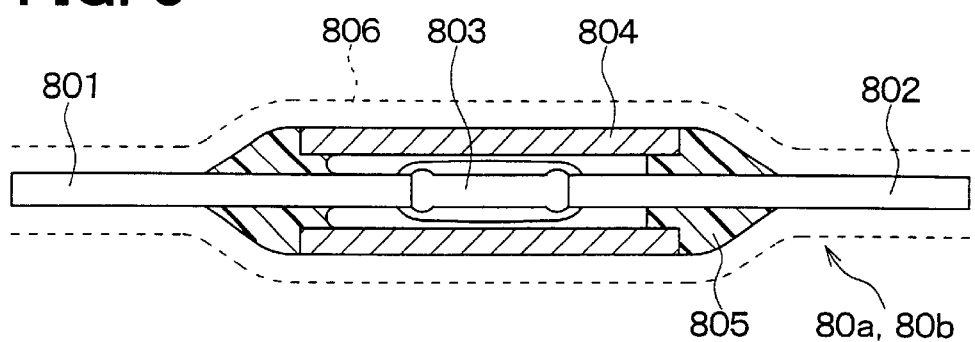
FIG. 3 is a cross-sectional view showing a structure of a thermal fuse shown in FIG. 2.

FIG. 3 shows a structure of each thermal fuse 80a, 80b. As shown in FIG. 3, leads 801, 802 are connected to each other through a meltable conductor 803 made of a low melting-point alloy that is melted at a set temperature (e.g., 170° C.). The leads 801, 802 are disposed to form a current-carrying circuit (electrical circuit) for each of the electrical heaters 53a, 53b. Generally, the meltable conductor 803 is covered with flux. Connection portions between the meltable conductor 803 and the leads 801, 802 are contained in a tubular ceramic insulation case (insulation case) 804. Both ends of the insulation case 804 are closed by resin members 805, and the insulation case 804 and the resin members 805 are covered with an insulation material 806.

In FIG. 2, DC power is supplied to the inverter 18 from the DC power source 17 through a fuse 70. The inverter 18, controlled by the air-conditioning ECU 19, produces frequency-variable AC power by switching the DC power using a compressor drive circuit 18a. The inverter 18 controls a rotation speed of the electrical compressor 16 using the frequency-variable AC power through the compressor drive circuit 18. The inverter 18 switches the DC power by using a heater drive circuit 18b controlled by the air-conditioning ECU 19, and duty-controls the DC power (DC output) to be supplied to the electrical heaters 53a, 53b. By the duty control of the inverter 18, voltage identical to that of the DC power source 17 is intermittently applied to the electrical heaters 53a, 53b through the heater drive circuit 18b.

For example, a heating amount (work amount) of cooling water, heated by the electrical heaters 53a, 53b, is controlled by controlling the duty ratio of electrical power to be supplied to the electrical heaters 53a, 53b. That is, the inverter 18 and the air-conditioning ECU 19 construct a controller for controlling a work amount of the electrical load by controlling electrical power to be supplied to the electrical load (e.g., electrical heaters 53a, 53b). Here, a transistor such as an insulated gate bipolar transistor (IGBT) is used as a switching element of the compressor drive circuit 18a and the heater drive circuit 18b. The inverter 18 further includes a control circuit 18c and a voltage detection circuit 18d. The control circuit 18c controls the operations of the compressor drive circuit 18a and the heater drive circuit 18b based on commands from the air-conditioning ECU 19. The voltage detection circuit 18d detects a voltage of the DC power source 17, and outputs a signal of the detected voltage to the air-conditioning ECU 19.

Figure 4:
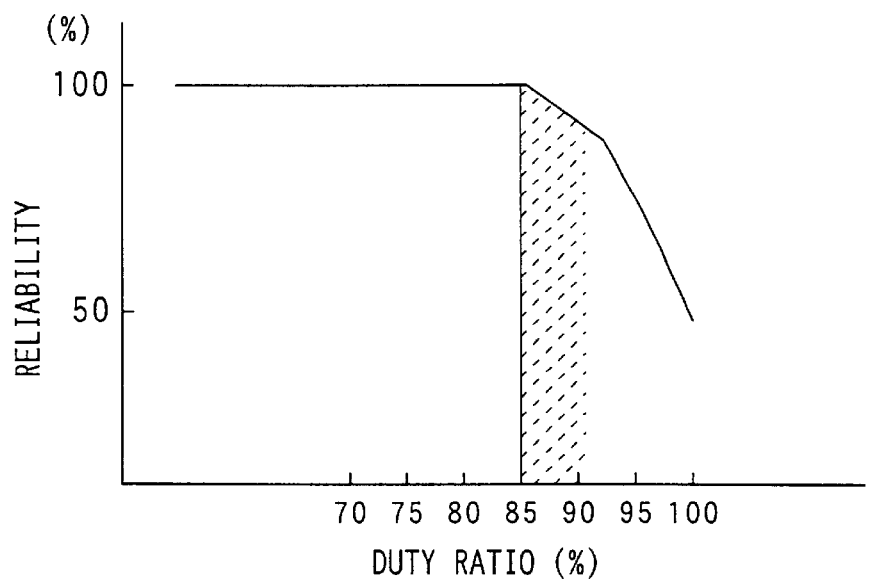
FIG. 4 is a graph showing a relationship between reliability of the thermal fuse and a duty ratio, according to the embodiment.
Figure 5:
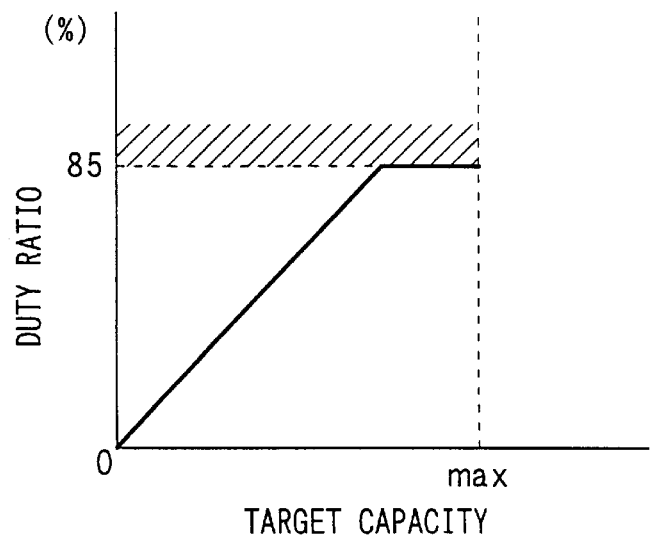
FIG. 5 is a characteristic graph showing a control example of an electrical heater shown in FIG. 1, according to the embodiment.

The present inventors have studied reliability of the thermal fuse 80a, 80b shown in FIG. 3 in the following manner. That is, the thermal fuse 80a, 80b and the electrical heater 53a, 53b are connected to an electrical circuit of DC 300V in series. The electrical heater 53a, 53b is duty-controlled at a drive frequency of 50 hertz (Hz), and is overheated to a temperature equal to or higher than a set temperature. Then, the reliability (the number of normal operation samples/the number of entire samples×100%) of the thermal fuse has been studied, and the test result is shown in FIG. 4. As shown in FIG. 4, it has been found that the reliability of 100% is obtained when the duty ratio is equal to or lower than 85%. Accordingly, in this embodiment, the electrical heaters 53a, 53b are duty-controlled at the frequency of 50 Hz. Further, a duty ratio, where a maximum heating capacity of the electrical heaters 53a, 53b is required, is set at 85%.

Next, operation of the vehicle air conditioner according to the this embodiment will be now described signals such as a temperature signal of cooling water (hot water), a temperature signal of outside air outside the passenger compartment, a temperature signal of inside air inside the passenger compartment and a signal of a sunlight amount radiated into the passenger compartment are input into the air-conditioning ECU 19. Further, signals of a desired temperature set by a passenger in the passenger compartment and the like, and signals from the first and second water temperature sensors 42, 54 are also input into the air-conditioning ECU 19. The air-conditioning ECU 19 calculates a target temperature of air to be blown into the passenger compartment based on the above signals. In addition, the air-conditioning ECU 19 controls the air mixing damper 15, the electrical compressor 16, the inverter 18, the three-way valve 51, the second water pump 52, the electrical heaters 53a, 53b, and the like, so that the temperature of air to be blown into the passenger compartment becomes the target temperature.

When an air-conditioning switch (not shown), for starting and stopping the air conditioner, is turned on, the air-conditioning ECU 19 starts operation of the second water pump 52, and controls the three-way valve 51 based on the signal from the first water temperature sensor 42, so that a flow direction of cooling water is switched in the second cooling water circuit 50. Specifically, when the temperature of cooling water having passed through the fuel cell 30 is equal to or higher than a set temperature, air to be blown into the passenger compartment can be sufficiently heated by using the cooling water. In this case, a cooling water flow between the second cooling-water circuit 50 and the second bypass cooling-water circuit 55a is closed by the three-way valve 51. Therefore, a cooling water circuit connecting the fuel cell 30, the electrical heaters 53a, 53b and the heater core 13 is formed. In this case, the cooling water having passed through the fuel cell 30 flows into the electrical heaters 53a, 53b, and the heater core 13. Then, the cooling water having passed through the heater core 13 is returned to a side of the fuel cell 30 in the direction indicated by arrow B1. In this case, since the cooling water is not need to be heated by the electrical heaters 53a, 53b, the electrical heaters 53a, 53b are not energized.

On the other hand, when the temperature of the cooling water having passed through the fuel cell 30 is lower than the set temperature, a communication between the second bypass cooling-water circuit 55 and a downstream water side of the fuel cell 30 in the first cooling water circuit 40 is closed while the second bypass cooling-water circuit 55 is made to communicate with an upstream water side of the second water pump 52 in the second cooling water circuit 50. Thus, the cooling water having passed through the heater core 13 does not flow to a side of the fuel cell 30 in the direction indicated by arrow B1, but is returned to a side of the second water pump 52 through the second bypass cooling-water circuit 55 in a direction indicated by arrow B2. In this case, the heating capacity of the electrical heaters 53a, 53b is controlled by controlling the duty ratio of the electrical power supplied to the electrical heaters 53a, 53b, so that the temperature of cooling water flowing into the heater core 13 is adjusted at a predetermined temperature.

In the above-described explanation, the duty ratio, where the maximum heating capacity of the electrical heaters 53a, 53b is required, is set at 85%. In this embodiment, the duty ratio for the maximum heating capacity of the electrical heaters 53a, 53b can be set lower than 100%, without being limited to 85%. Accordingly, even when the electrical heaters 53a, 53b are operated at the maximum heating capacity, the power supply to the electrical heaters 53a, 53b can be stopped intermittently. For example, electrical power supplied to the electrical heaters 53a, 53b can be stopped during some milliseconds (ms) in a duty control cycle. When each meltable conductor 803 of the thermal fuses 80a, 80b is fused due to abnormal heating of the electrical heaters 53a, 53b, an arc is generated. The arc disappears while the power supply is stopped, or while the voltage applied to the electrical heaters 53a, 53b is zero, thereby preventing the thermal fuses 80a, 80b from being again welded after being fused. That is, when the electrical heaters 53a, 53b are abnormally heated, each meltable conductor 803 of the thermal fuses 80a, 80b is surely blown by receiving heat of the electrical heaters 53a, 53b, and the electrical circuit for the electrical heaters 53a, 53b can be accurately disconnected.

Figure 6:
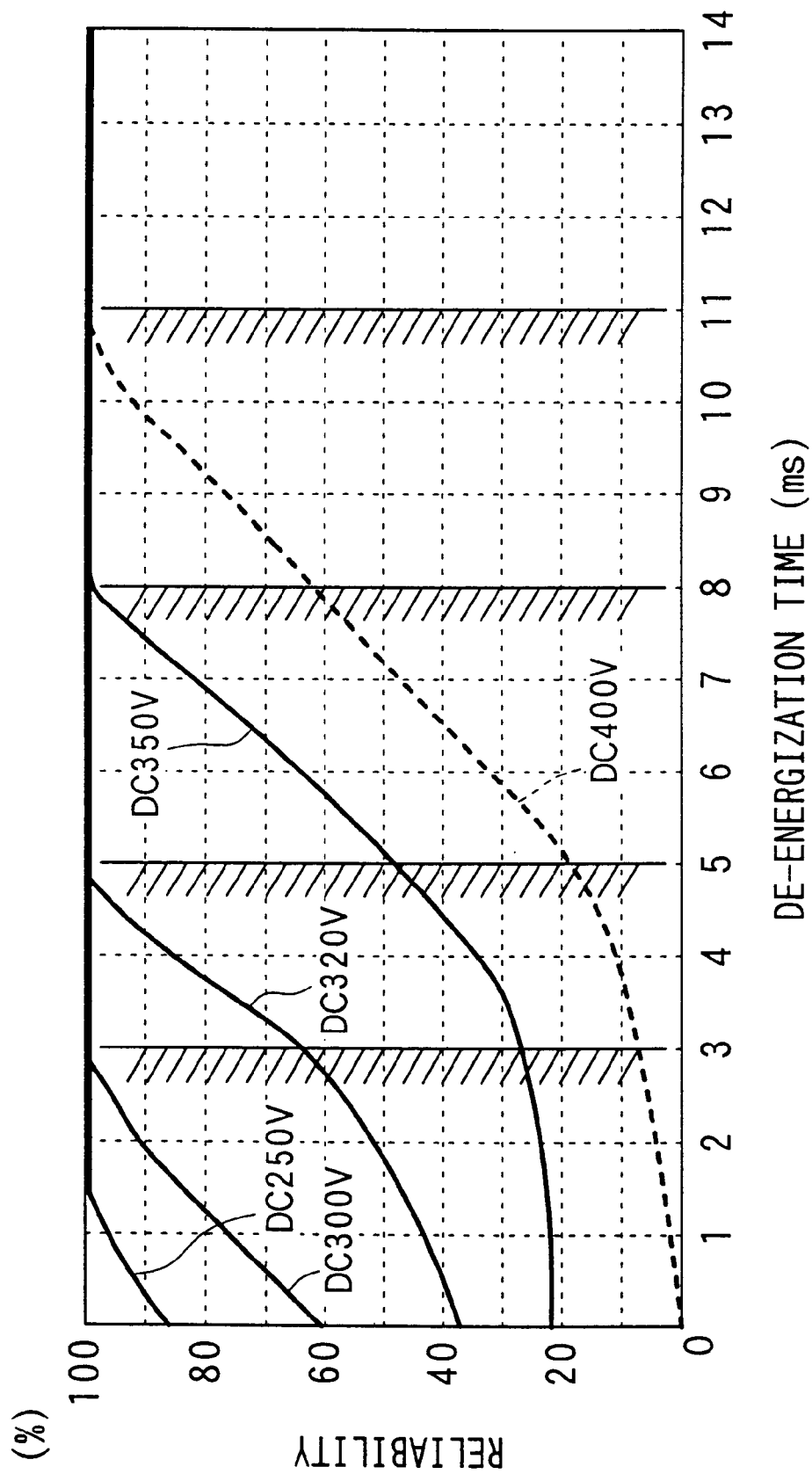
FIG. 6 is a graph showing a test result of a relationship between reliability of the thermal fuse and a de-energization time, according to the embodiment.
Figure 7:
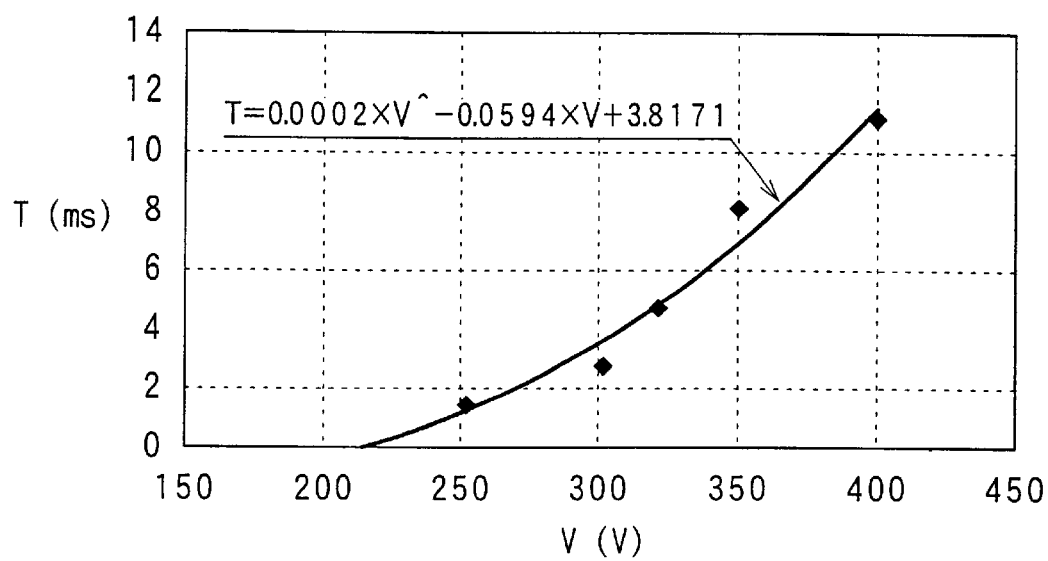
FIG. 7 is a graph showing a relationship between a de-energization time T by which reliability of 100% can be obtained, and a direct-current (DC) voltage V, based on the test result shown in FIG. 6.
Figure 10:
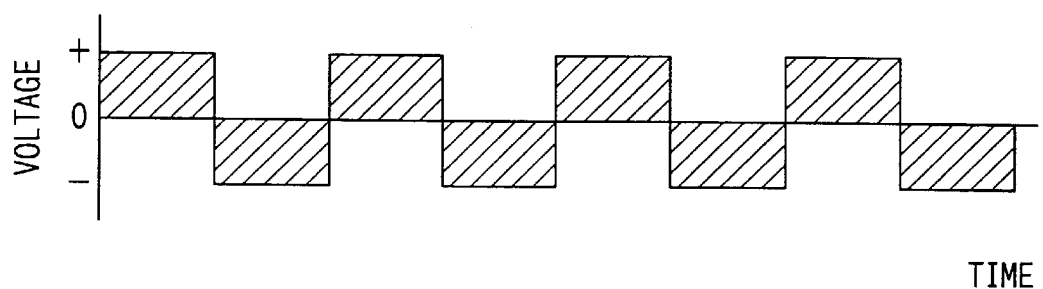
FIG. 10 is a graph showing a wave form of a voltage supplied to an electrical load in a conventional apparatus.

In experiments of the present inventors, each thermal fuse and each electrical heater are connected in series, to an electrical circuit of DC 250V, DC 300V, DC 320V, DC 350V and DE 400V. FIG. 6 is the experiment results showing the relationship between the reliability and the de-energization time. As shown in FIG. 6, in a case of DC 300V, it has been found that the reliability of 100% is obtained in the thermal fuse when a de-energization time, for which the power supply to the electrical heater is stopped, is equal to or longer 3 ms. Further, it has been found that the reliability of 100% is obtained in the thermal fuse when the de-energization time is equal to or longer than 5 ms in a case of DC 320V. The reliability of 100% is obtained in the thermal fuse when the de-energization time is equal to or longer than 8 ms in a case of DC 350V. Similarly, the reliability of 100% is obtained in the thermal fuse when the de-energization time is equal to or longer than 11 ms in a case of DC 400V. As shown in FIG. 7, it has been found that de-energization time T can be approximately indicated by a formula ($T=0.0002 \times V^2 - 0.0594 \times V + 3.8171$). Here, V is the normal maximum voltage of the DC power supply source 17.

In this embodiment, when the electrical heaters 53a, 53b are need to be operated by the maximum heating capacity, a de-energization time (minimum de-energization time) is suitably set based on the normal maximum voltage of the DC power source 17, so that the meltable conductors 803 of the thermal fuses 80a, 80b are accurately blown and the electrical circuits of the electrical heaters 53a, 53b are accurately disconnected when the electrical heaters 53a, 53b are abnormally heated. Here, generally, the DC power source 17 mounted in an electrical vehicle has a rated voltage of 288V. In this case, a maximum output voltage of the DC power source 17 is approximately 110% of the rated voltage, except for a particular charge/discharge state such as a braking charge time. Therefore, the normal maximum voltage of the DC power source 17 is set approximately at 110% of the rated voltage, for example, 317V (288×1.1), in the embodiment.

Since the normal maximum voltage of the DC power source 17 with the rated voltage of 288V is 317V, the minimum de-energization time of the DC power source 17 is set at 5 ms based on test results shown in FIG. 6. For example, when the duty drive frequency of the electrical heaters 53a, 53b is set at 1 Hz, the minimum de-energization time of 5 ms can be ensured by setting the duty ratio at 99.5% when the maximum heating capacity is required. Here, the minimum de-energization time may be set longer than 5 ms.

When the DC power source 17 with an another rated voltage different from 288V is used, the minimum de-energization time is suitably set in accordance with the normal maximum voltage corresponding to the rated voltage of the DC power source 17. Specifically, when the normal maximum voltage of the DC power source 17 is equal to or smaller than 300V, the minimum de-energization time is set equal to or longer than 3 ms. When the normal maximum voltage of the DC power source 17 is larger than 300V and is equal to or smaller than 320V, the minimum de-energization time is set equal to or longer than 5 ms. When the normal maximum voltage of the DC power source 17 is larger than 320V and is equal to or smaller than 350V, the minimum de-energization time is set equal to or longer than 8 ms. When the normal maximum voltage of the DC power source 17 is larger than 350V and is equal to or smaller than 400V, the minimum de-energization time is set equal to or longer than 11 ms.

Figure 8:
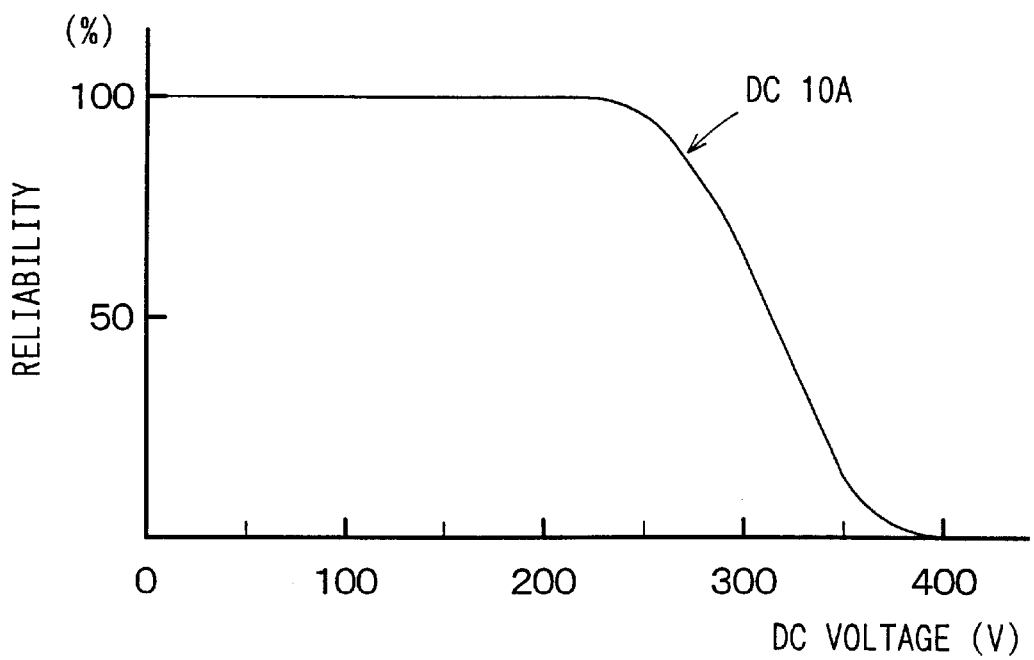
FIG. 8 is a graph showing a test result of a relationship between the reliability of a thermal fuse and a DC voltage at DC 10 amperes (A), according to the embodiment.
Figure 9:
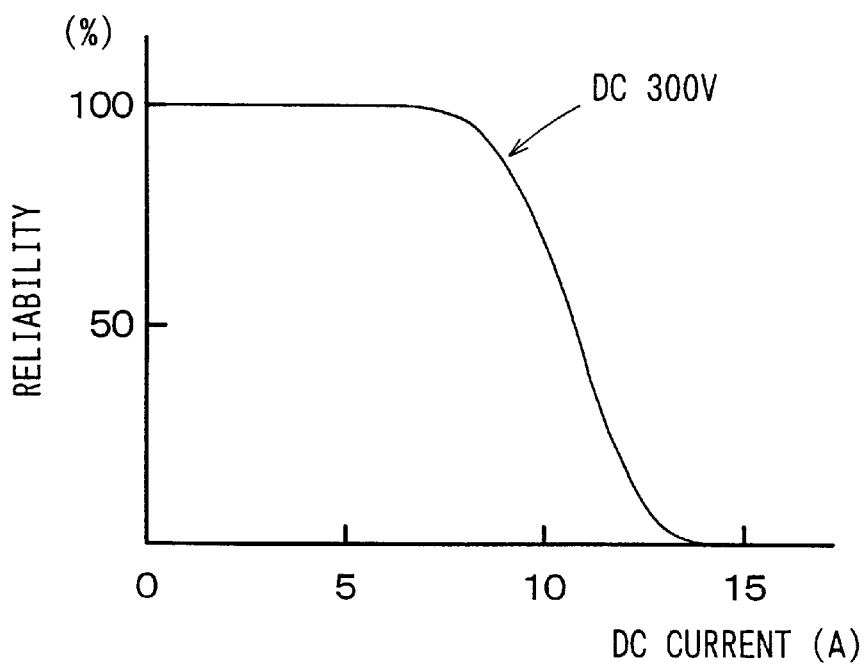
FIG. 9 is a graph showing a test result of a relationship between the reliability of the thermal fuse and a DC current at DC 300 volts (v), according to the embodiment.

Generally, when the electrical heaters 53a, 53b and the fuel cell 30 are used as a heating source for heating air to be blown into the passenger compartment, an electrical heater having a heating capacity of approximate 3 kW is required in a general size vehicle. However, as shown in FIGS. 8, 9, when a thermal fuse is used for protecting an electrical heater having a heating capacity of approximate 3 kW in a case of DC 300V, the reliability of 100% cannot be obtained in the thermal fuse.

However, in this embodiment, a necessary heating capacity can be obtained using two electrical heaters 53a, 53b each having a heating capacity of approximate 1.5 kW.

Further, two electrical heaters 53a, 53b are connected in parallel, and the thermal fuses 80a, 80b are connected to the electrical heaters 53a, 53b in series, respectively. Thus, a current passing through each electrical heater 53a, 53b and each thermal fuse 80a, 80b is made smaller, thereby obtaining the reliability of 100% for the thermal fuses 80a, 80b. Specifically, when the DC power source 17 generates a rated voltage of 300V, a current flowing through one thermal fuse is 5 amperes (A), and electrical power consumed in one electrical heater is 1.5 kW, thereby attaining the reliability of 100% for the thermal fuses 80a, 80b. Accordingly, when the electrical heaters 53a, 53b are abnormally heated, the meltable conductors 803 of the thermal fuses 80a, 80b are accurately blown by receiving heat of the electrical heaters 53a, 53b. Accordingly, the electrical circuits of the electrical heaters 53a, 53b can be accurately closed at the abnormal heating of the electrical heaters 53a, 53b.

Further, in this embodiment, the maximum power actually used for each electrical heater 53a, 53b is restricted to be equal to or higher than 0.5 KW. Accordingly, heating capacity of each electrical heater 53a, 53b can be effectively improved.

Although the present invention has been fully described in connection with the preferred embodiment thereof with reference to the accompanying drawings, it is to be noted that various changes and modifications will become apparent to those skilled in the art.

For example, in the above-described embodiment of the present invention, both the electrical heaters 53a, 53b are used. However, three or more electrical heaters may be used, or one electrical heater may be used. In this case, a thermal fuse is connected to each electrical heater in series, and the rated voltage of the DC power source 17 and a resistance value of the electrical heater are suitably set, so that the maximum power actually used for each electrical heater is restricted equal to or lower than 2 kW, and the reliability of 100% can be obtained in the thermal fuse.

In the above-described embodiment of the present invention, the electrical heaters 53a, 53b may not be duty-controlled but may be pulse-width-modulation (PWM) controlled. Further, the minimum de-energization time may not be set based on the normal maximum voltage obtained from the rated voltage of the DC power source 17, but may be set in accordance with the voltage of the DC power source 17 detected by the voltage detection circuit 18d. Further, the drive frequency of the electrical heaters 53a, 53b may not be limited to 1 Hz or 50 Hz, but can be another frequency.

In the above-described embodiment of the present invention, a positive temperature coefficient (PTC) heater having a PTC thermistor may be used as each of the electrical heaters 53a, 53b in place of the sheath heater. In the above-described embodiment, the electrical heaters 53a, 53b are disposed in the second cooling-water circuit 50. However, the electrical heaters 53a, 53b can be disposed in the air passage duct 10 around the heater core 13 to directly heat air. In this case, when the heating capacity of the heater core 13 for heating air is insufficient, air passing through the air passage duct 10 may be directly heated using heat from the first and second electrical heaters 53a, 53b.

Further, the present invention may be applied to a heat pump cycle having cooling and heating functions in a refrigerant cycle system. Furthermore, the present invention may be applied to a controller for controlling an electrical heater driven with DC power, without being limited to the above-described embodiment.

Such changes and modifications are to be understood as being within the scope of the present invention as defined by the appended claims.

What is claimed is:

1. An electrical load controller comprising:

an electrical load to which electrical power is supplied from a DC power source through an electrical circuit;

a thermal fuse being blown at an abnormal heating of the electrical load, for disconnecting the electrical circuit at the abnormal heating; and a controller for controlling a work amount of the electrical load by intermittently controlling a supply of electrical power to the electrical load, wherein:

the controller intermittently stops the supply of the electrical power to the electrical load even in a maximum work area where the controller controls the work amount of the electrical load at a maximum work amount; and the electrical load is an electrical heater for heating air to be blown into a compartment.

2. The electrical load controller according to claim 1, wherein:

the controller duty-controls the electric heater by a duty ratio; and when the controller duty-controls the electric heater by the maximum heating capacity, the duty ratio is set lower than 100%.

3. An electrical load controller comprising:

an electrical load to which electrical power is supplied from a DC power source through an electrical circuit;

a thermal fuse being blown at an abnormal heating of the electrical load, for disconnecting the electrical circuit at the abnormal heating; and a controller for controlling a work amount of the electrical load by intermittently controlling a supply of electrical power to the electrical load, wherein:

the controller intermittently stops the supply of the electrical power to the electrical load even in a maximum work area where the controller controls the work amount of the electrical load at a maximum work amount; and when a time, for which the supply of the electrical power to the electrical load is stopped, is defined as T (milliseconds), and when a normal maximum voltage of the DC power source is defined as Vh (volts), the T and the Vh have a relationship of $T \geq (0.0002 \times Vh^2 0.0594 \times Vh + 3.8171)$.

4. An electrical load controller comprising:

an electrical load to which electrical power is supplied from a DC power source through an electrical circuit;

a thermal fuse being blown at an abnormal heating of the electrical load, for disconnecting the electrical circuit at the abnormal heating; and a controller for controlling a work amount of the electrical load by intermittently controlling a supply of electrical power to the electrical load, wherein:

the controller intermittently stops the supply of the electrical power to the electrical load even in a maximum work area where the controller controls the work amount of the electrical load at a maximum work amount; and the controller stops the electrical power supplied to the electrical load for a predetermined time; and the predetermined time is set to be equal to or longer than 3 milliseconds when a normal maximum voltage of the DC power source is equal to or lower than 300 volts.

5. An electrical load controller comprising:

an electrical load to which electrical rower is supplied from a DC power source through an electrical circuit;

a thermal fuse being blown at an abnormal heating of the electrical load, for disconnecting the electrical circuit at the abnormal heating; and a controller for controlling a work amount of the electrical load by intermittently controlling a supply of electrical power to the electrical load, wherein:

the controller intermittently stops the supply of the electrical power to the electrical load even in a maximum work area where the controller controls the work amount of the electrical load at a maximum work amount; and the controller stops the electrical power supplied to the electrical load for a predetermined time; and the predetermined time is set to be equal to or longer than 5 milliseconds when a normal maximum voltage of the DC power source is equal to or lower than 320 volts.

6. An electrical load controller comprising:

an electrical load to which electrical power is supplied from a DC power source through an electrical circuit;

a thermal fuse being blown at an abnormal heating of the electrical load, for disconnecting the electrical circuit at the abnormal heating; and a controller for controlling a work amount of the electrical load by intermittently controlling a supply of electrical power to the electrical load, wherein:

the controller intermittently stops the supply of the electrical power to the electrical load even in a maximum work area where the controller controls the work amount of the electrical load at a maximum work amount; and the controller stops the electrical power supplied to the electrical load for a predetermined time; and the predetermined time is set to be equal to or longer than 8 milliseconds when a normal maximum voltage of the DC power source is equal to or lower than 350 volts.

7. An electrical load controller comprising:

an electrical load to which electrical power is supplied from a DC power source through an electrical circuit;

a thermal fuse being blown at an abnormal heating of the electrical load, for disconnecting the electrical circuit at the abnormal heating; and a controller for controlling a work amount of the electrical load by intermittently controlling a supply of electrical power to the electrical load, wherein:

the controller intermittently stops the supply of the electrical power to the electrical load even in a maximum work area where the controller controls the work amount of the electrical load at a maximum work amount;

the controller stops the electrical power supplied to the electrical load for a predetermined time; and the predetermined time is set to be equal to or longer than 11 milliseconds when a normal maximum voltage of the DC power source is equal to or lower than 400 volts.

8. The electrical load controller according to claim 1, wherein thermal fuse is constructed to be blown due to heat of the electrical load at the abnormal heating of the electrical load.

9. The electrical load controller according to claim 1, wherein:

the electrical load has a plurality of electrical load parts connected in parallel with respect to the DC power source, each of the electrical load parts being energized by the DC power source through each circuit part of the electrical circuit;

the thermal fuse has a plurality of fuse parts, each of which is connected to each of the electrical loads in series; and each fuse part is blown at abnormal heating of each electrical load part, to disconnect each circuit part.

10. The electrical load controller according to claim 9, wherein each electrical load part is an electrical heater for heating air.

11. The electrical load controller according to claim 9, wherein maximum power actually used for each electrical load part is restricted equal to or lower than 2 kW.

12. The electrical load controller according to claim 9, wherein maximum power actually used for each electrical load part is restricted equal to or higher than 0.5 kW.

13. The electrical load controller according to claim 9, wherein:

each fuse part includes a meltable conductor melted at a temperature equal to or higher than a set temperature; and two terminals of each circuit part are connected to each other by the meltable conductor of each fuse part.

14. An air conditioner for a vehicle having a passenger compartment, comprising:

a duct defining an air passage through which air flows into the passenger compartment;

an electrical heater, for heating air flowing through the air passage, to which electrical power is supplied from a DC power source through an electrical circuit;

a thermal fuse being blown at an abnormal heating of the electrical heater, for disconnecting the electrical circuit at the abnormal heating; and a controller for controlling a heating capacity of the electrical heater by intermittently controlling electrical power to be supplied to the electrical heater, wherein:

the controller intermittently stops the supply of the electrical power to the electrical heater even in a maximum heating where the heating capacity of the electrical heater is controlled by the controller at a maximum heating capacity.

15. The air conditioner according to claim 14, wherein the electrical heater is disposed in the duct to heat air.

16. The air conditioner according to claim 14, further comprising:

a heater core for heating air passing therethrough using a thermal fluid as a heating source, wherein:

wherein the electrical heater is disposed to heat the thermal fluid flowing into the heater core.

17. The air conditioner according to claim 14, wherein:

the controller duty-controls the electric heater by a duty ratio; and when the controller duty-controls the electric heater by the maximum heating capacity, the duty ratio is set lower than 100%.

18. The air conditioner according to claim 14, wherein:

the electrical heater has a plurality of electrical heater parts connected in parallel with respect to the DC power source, each of the electrical heater parts being energized by the DC power source through each circuit part of the electrical circuit;

the thermal fuse has a plurality of fuse parts each of which is connected to each of the electrical heater parts in series; and each fuse part is blown at an abnormal heating of each electrical heater part, to disconnect each circuit part.

19. The electrical load controller according to claim 3, wherein the electrical load is an electrical heater for heating a fluid.

20. The electrical load controller according to claim 4, wherein the electrical load is an electrical heater for heating a fluid.

21. The electrical load controller according to claim 5, wherein the electrical load is an electrical heater for heating a fluid.

22. The electrical load controller according to claim 6, wherein the electrical load is an electrical heater for heating a fluid.

23. The electrical load controller according to claim 7, wherein the electrical load is an electrical heater for heating a fluid.

* * * * *